United States Patent

[11] 3,547,075

[72] Inventor Richard T. Johnson
    Sandusky, Ohio
[21] Appl. No. 740,701
[22] Filed June 27, 1968
[45] Patented Dec. 15, 1970
[73] Assignee Sam Stein Associates, Inc.
    Sandusky, Ohio

[54] BREADING MACHINE
    4 Claims, 27 Drawing Figs.
[52] U.S. Cl. .................................................. 118/16,
    118/21, 118/24
[51] Int. Cl. .................................................. B05c 11/00
[50] Field of Search .......................................... 118/13, 16,
    400, 506, 23, 21, 24

[56] References Cited
    UNITED STATES PATENTS
    2,115,969  5/1938  Truesdell ................ 118/13
    2,300,396  11/1942 Bookidis ................ 118/16
    2,782,754  2/1957  Bookidis ................ 118/13

Primary Examiner—John P. McIntosh
Attorney—Baldwin, Egan, Walling and Fetzer

ABSTRACT: A machine for coating a food product with breading material has an elevated hopper for storing the breading material and means for feeding the same in a smooth and controlled manner from the hopper, through a free-flowing downspout to be deposited on a belt beneath the food product, together with means for feeding the breading material in a smooth and controlled manner from the hopper to be deposited on top of the food product with a control valve at such outlet to control the rate of feed. A breading level plate is provided to maintain an even layer of breading material beneath the food product on the conveyor belt and this plate is resiliently mounted to relieve pressure of breading material building up behind the plate; and edge control plates are provided for preventing spillage of breading material at the sides of the conveyor belt. A hooded portion of open mesh belt conveyor is provided near the discharge end of the machine with air spray pipes above the belt to remove excess material, and the hood is adapted to be raised without interrupting the operation of the machine. In a modification, a flip bar is provided across the conveyor belt toward the discharge end of the machine to flip over the product so as to shake out breading material lodging in cavities of the food product, together with a novel arrangement for taking up excess length of the belt after it passes over the raised flip bar.

INVENTOR
Richard T. Johnson
BY
Baldwin, Egan, Walling & Fetzer
ATTORNEYS

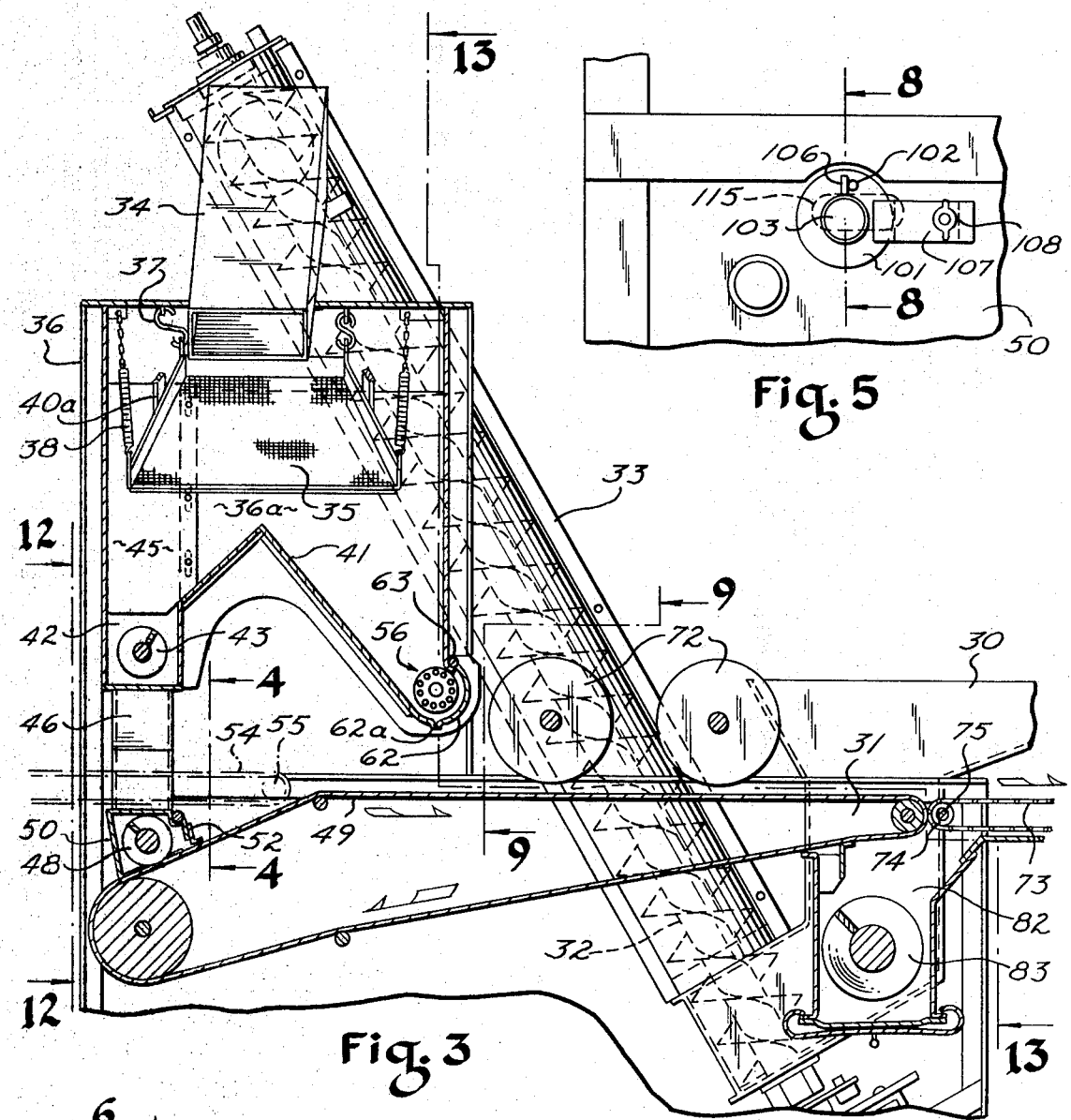
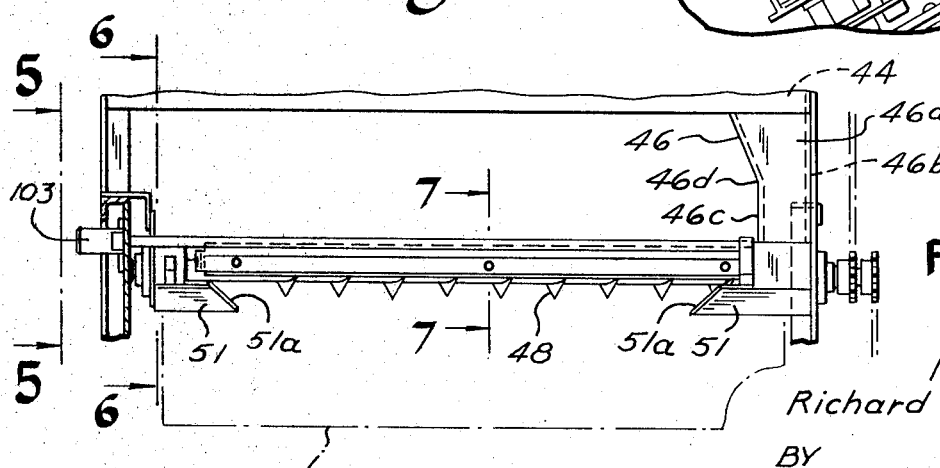

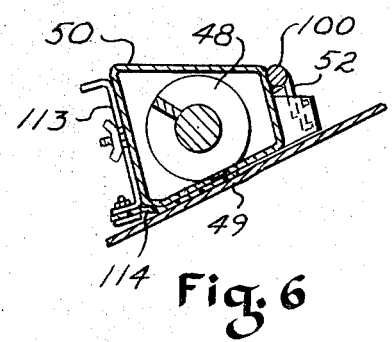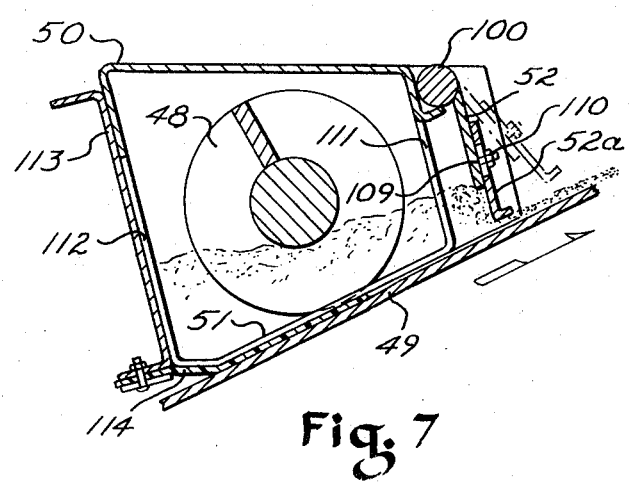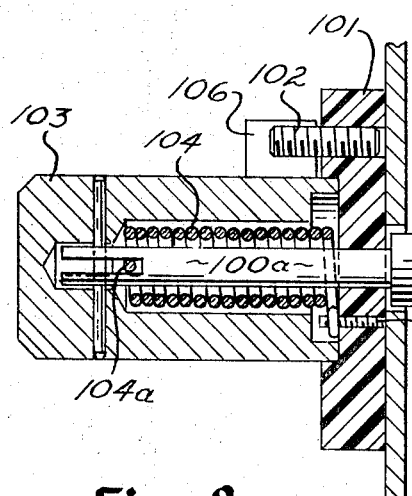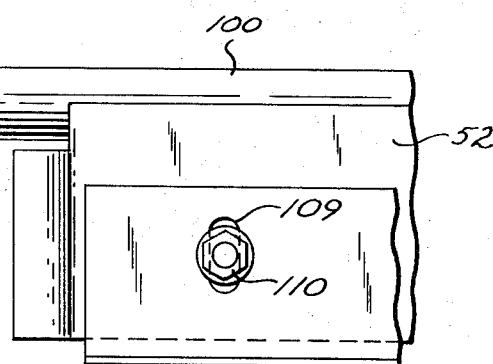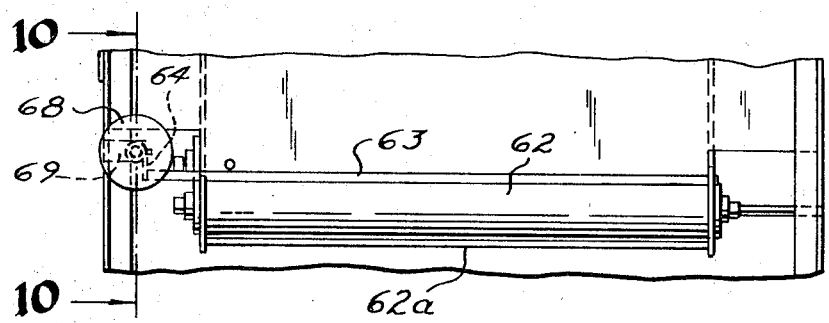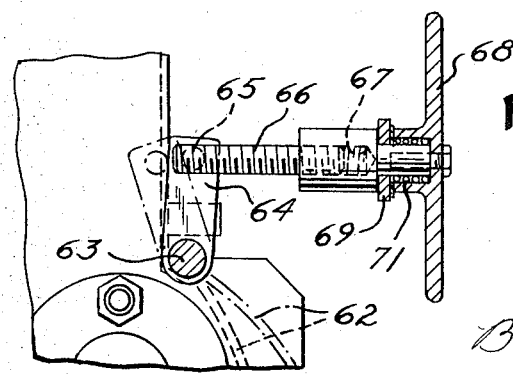

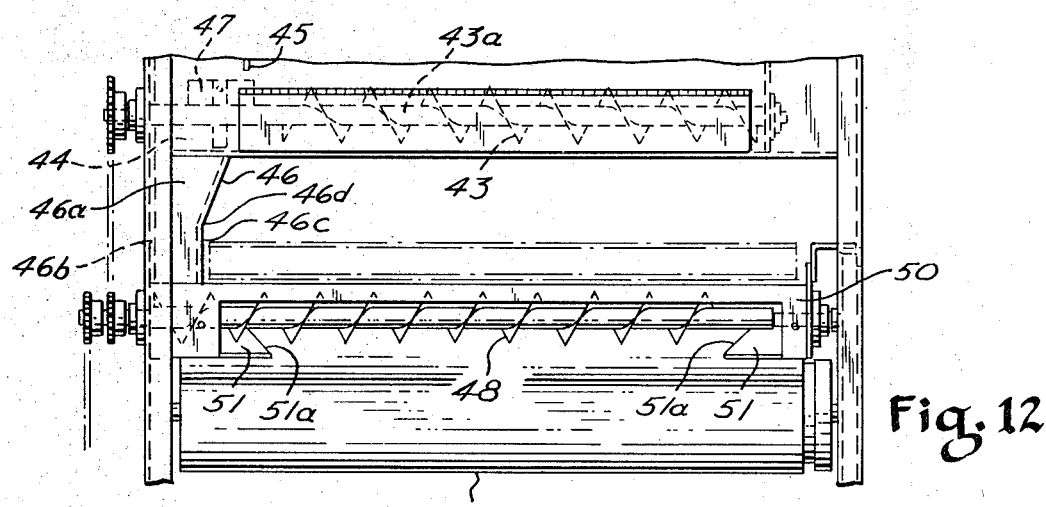
Fig. 12
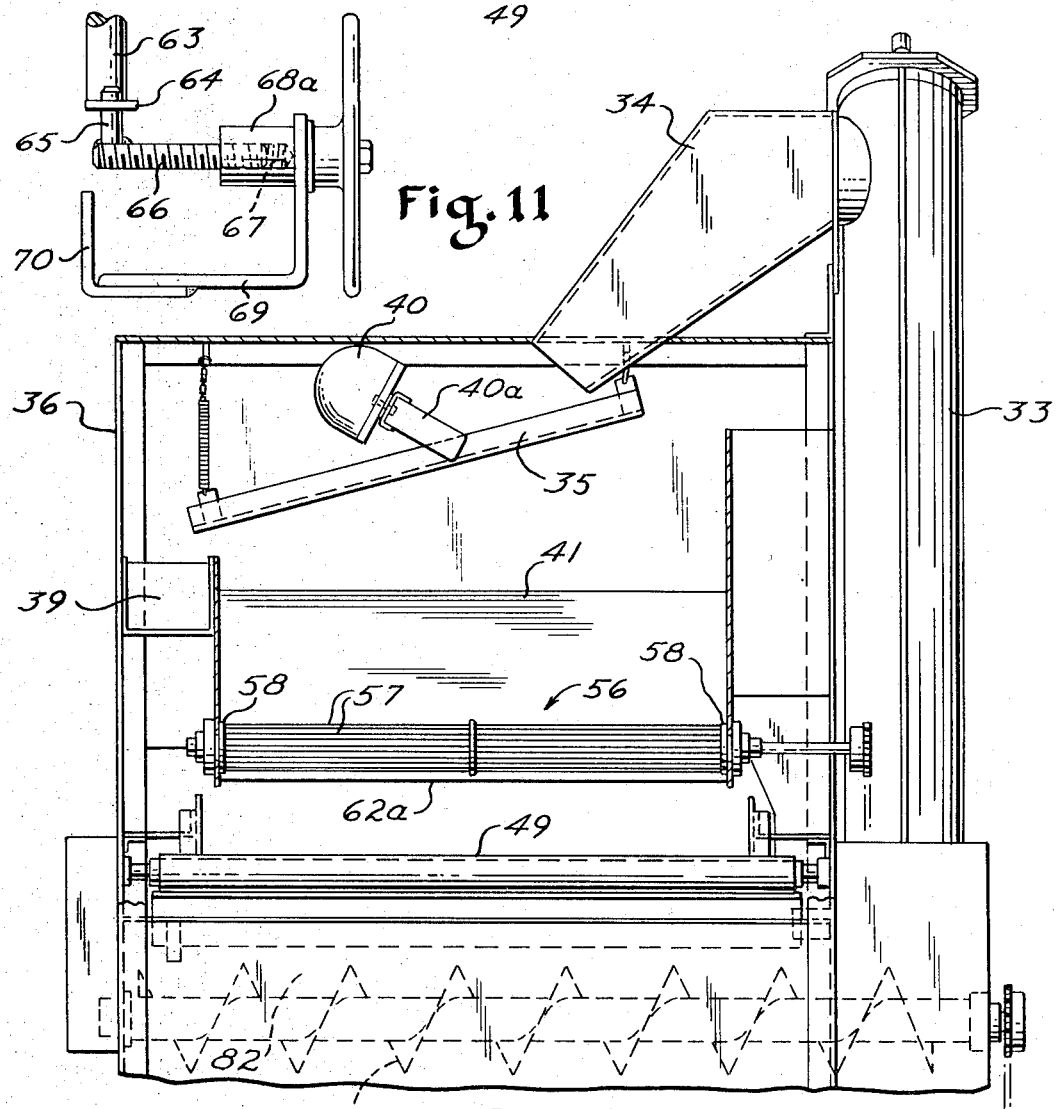
Fig. 11
Fig. 13

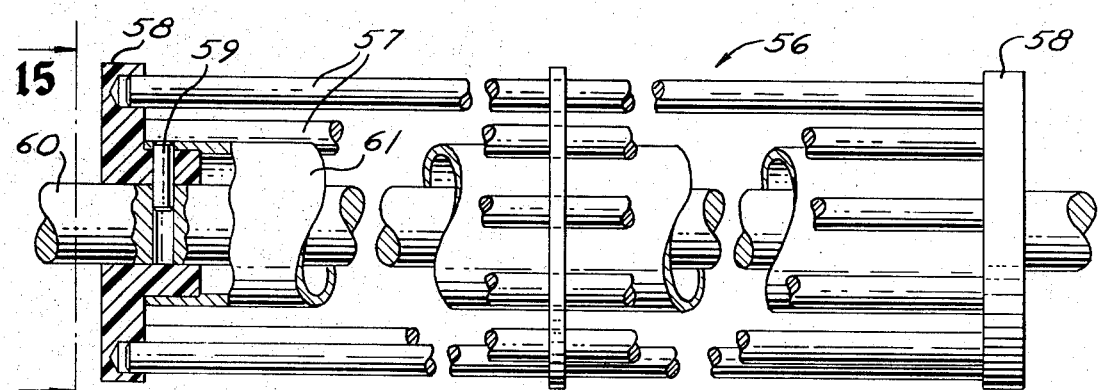
Fig. 14
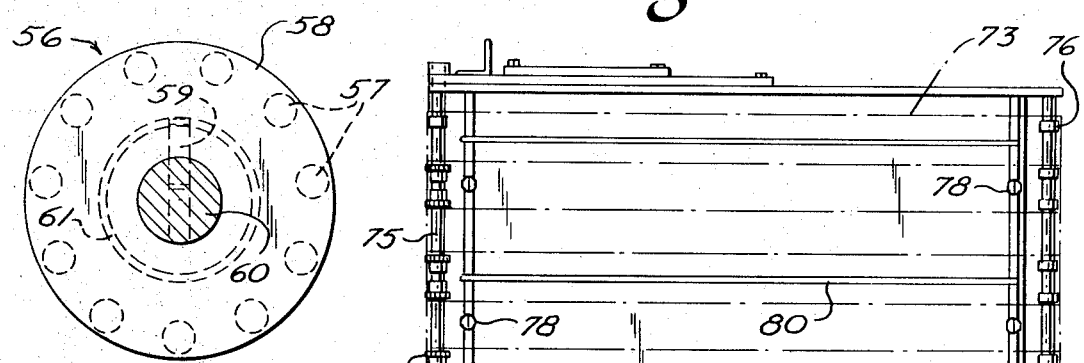
Fig. 15
Fig. 16
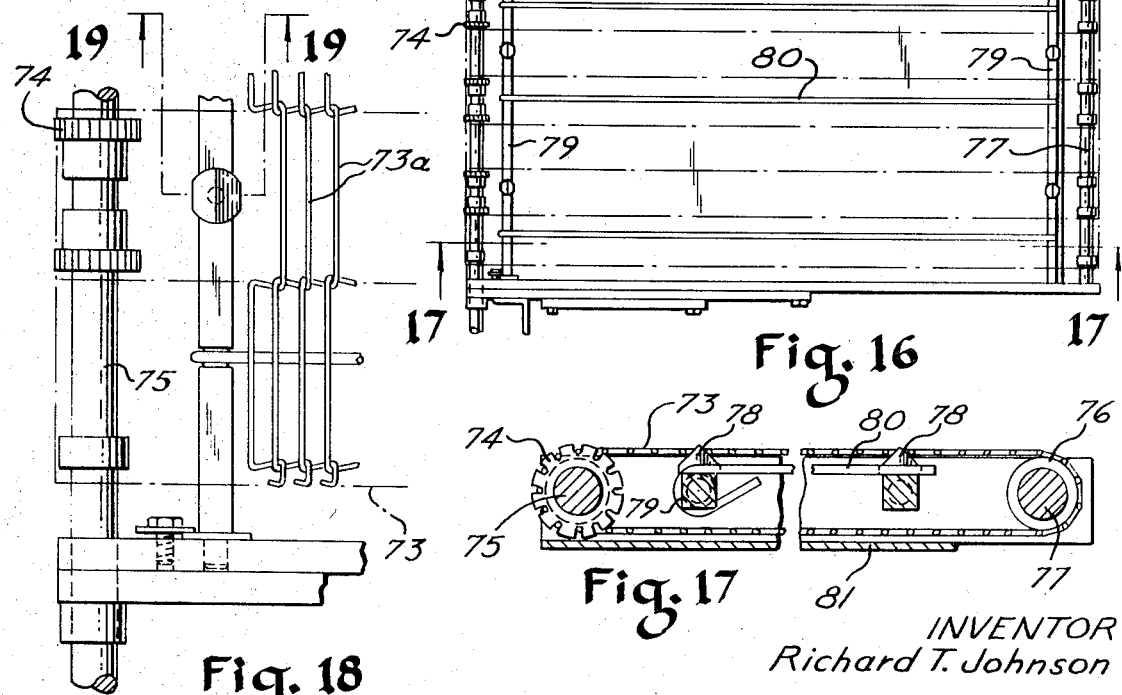
Fig. 17
Fig. 18
INVENTOR
Richard T. Johnson
BY
Baldwin, Egan, Walling & Fetzer
ATTORNEYS INVENTOR
Richard T. Johnson
BY
Baldwin, Egan, Walling & Fetzer
ATTORNEYS INVENTOR
Richard T. Johnson
BY
Baldwin, Egan, Walling & Fetzer
ATTORNEYS 3,547,075

1

BREADING MACHINE

The term "breading material" as included in the specification and claims hereof is intended to include any finely divided solid material for coating food products, including, among other things, flour, prepared breading mix, ground bread and cracker crumbs, ground spices, and other materials.

It is well known that in handling breading material for coating food products, especially very finely divided solid material such as flour, that it is very difficult to feed the breading material in a smooth and controlled manner so as to avoid bridging over of the material in hoppers and passageways and to prevent the clogging of the free flow of the material.

It is an object of the present invention to feed the finely divided breading material in a smooth and controlled manner from an elevated hopper to deposit a layer on a conveyor belt beneath the food product. The present invention accomplishes this by moving the breading material out of the bottom of the storage hopper by means of a screw conveyor, each flight of which propels an increment of breading material to a downspout having its sidewalls so constructed that the material drops freely by gravity to the bottom of the spout near which it is deposited on the conveyor belt. At that point, just above the belt, the breading material is distributed across the conveyor belt by a screw conveyor downstream from which is a leveling plate resiliently supported so that if, due to malfunctioning of the machine, breading material builds up on the belt behind the leveling plate, it may move in such a manner as to relieve the pressure so that the parts are not damaged. This leveling plate has adjustable stop means to limit the thickness of the layer deposited on the conveyor belt and the entire leveling plate and control knob is movable from its position in the machine while the machine is running.

Another object of the invention is to provide a hinged hood over an open mesh wire belt near the discharge end of the machine, there being air spray pipes beneath the hood adjustable along their entire length with respect to their spacing above the food product on the belt and the hood and air pipes can be raised for inspection or adjustment without interrupting the operation of the machine.

A further object of the invention is to provide a flip bar to cause the food product to flip over on the open mesh belt near the discharge end of the machine if necessary to shake breading material out of cavities in the food product, such as the breast of a chicken. This flip bar raises a portion of the belt above the normal level and a novel takeup is provided for the excess belt material permitting different heights of the flip bar using the same length of belt.

Other objects and advantages of this invention will be apparent from the accompanying drawings and description and the essential features thereof will be set forth in the appended claims.

In the drawings:

FIG. 3 is a central sectional view through the machine of FIGS. 1 and 2 with certain parts omitted for clarity;

FIG. 4 is a fragmental sectional view taken along the line 4–4 of FIG. 3;

FIG. 5 is an end view of FIG. 4, enlarged;

FIG. 6 is an enlarged fragmental sectional view taken along the line 6–6 of FIG. 4;

FIG. 7 is a fragmental sectional view taken along the line 7–7 of FIG. 4 and greatly enlarged;

FIG. 8 is an enlarged fragmental sectional view taken along the line 8–8 of FIG. 5;

FIG. 9 is a fragmental sectional view taken along the line 9–9 of FIG. 3;

FIG. 10 is an enlarged fragmental sectional view taken along the line 10–10 of FIG. 9;

FIG. 11 is a top plan view of FIG. 10;

FIG. 12 is a fragmental end view of FIG. 3;

FIG. 13 is a view taken along the line 13–13 of FIG. 3, partly in section and partly in end elevation;

2

Figure 2:
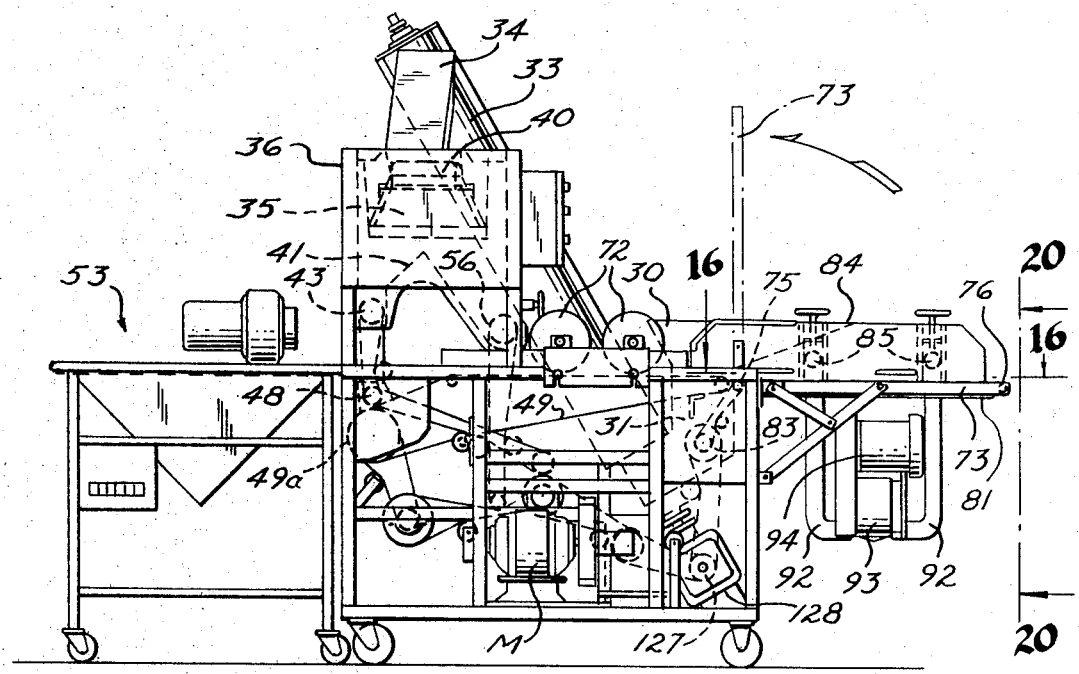
FIG. 2 is a side elevational view of the machine of FIG. 1.
Figure 19:
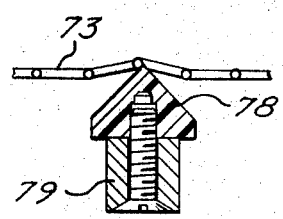
Figure 20:
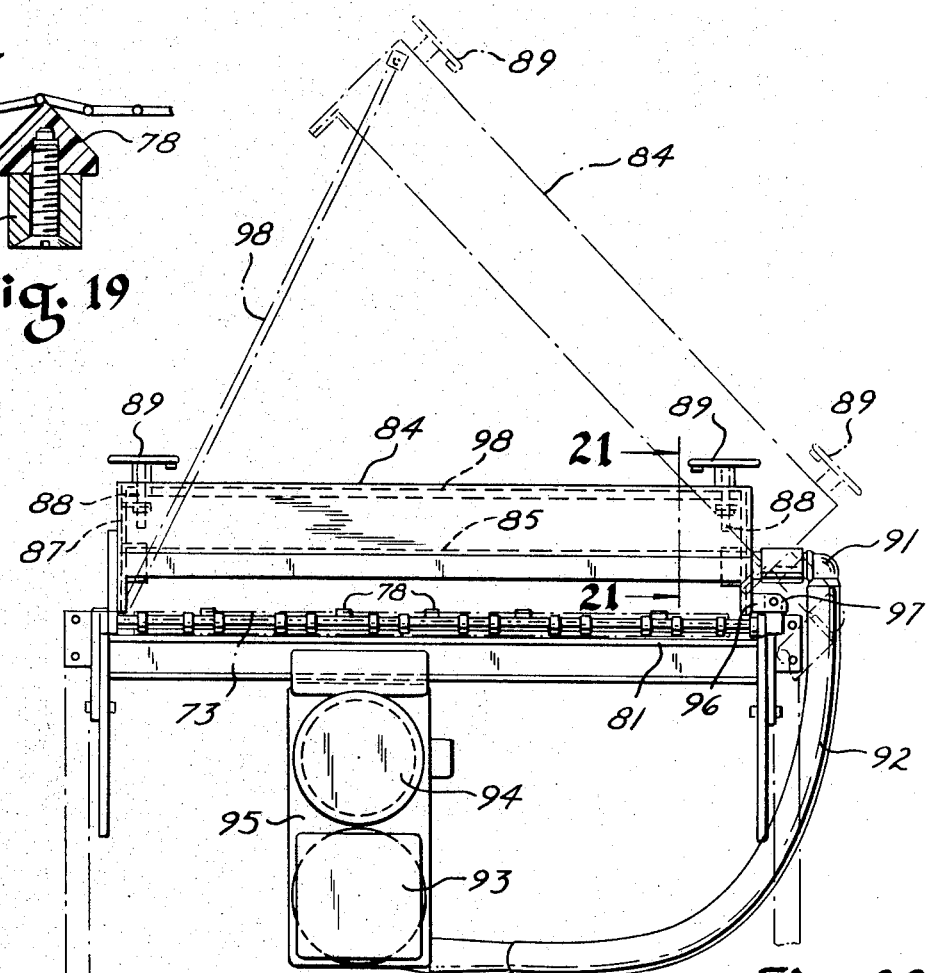
Figure 21:
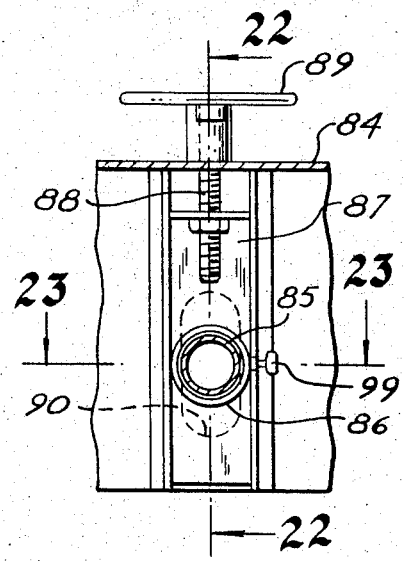
Figure 22:
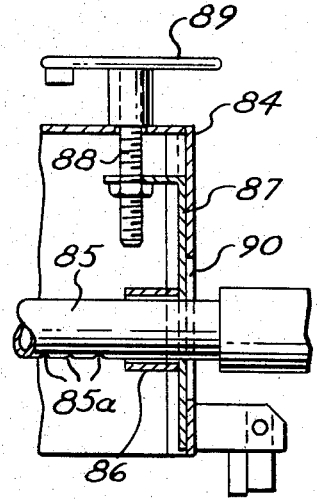
Figure 23:
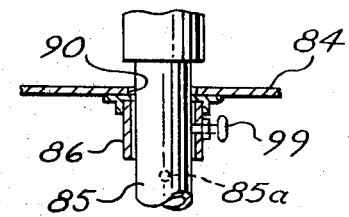
Figure 24:
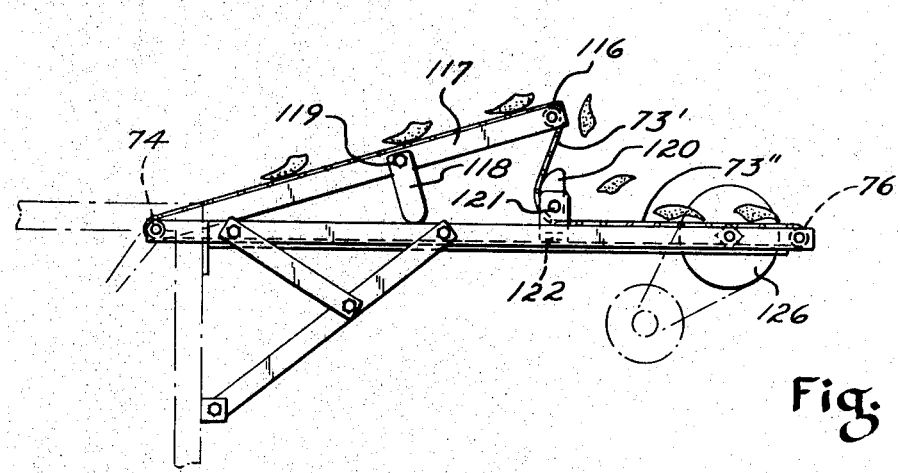
Figure 25:
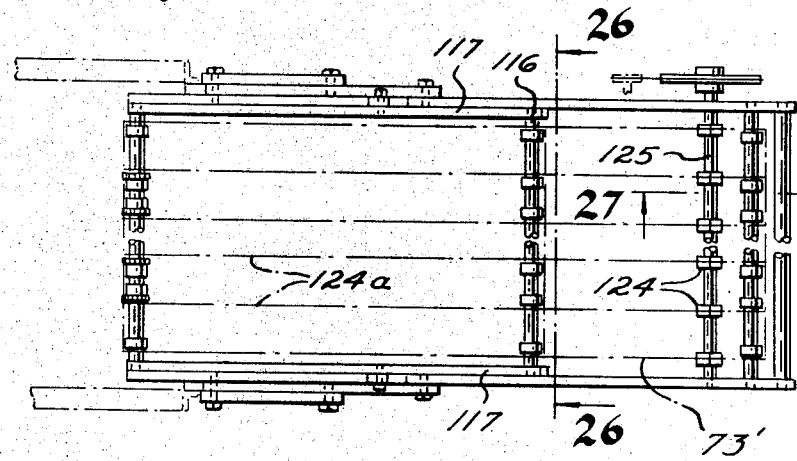
Figure 26:
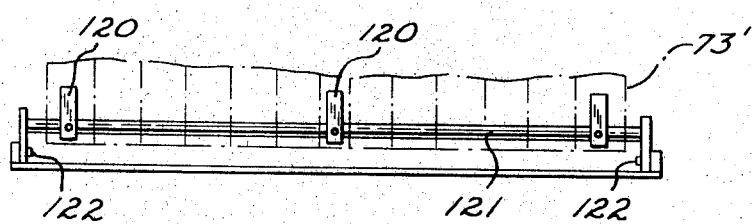
Figure 27:
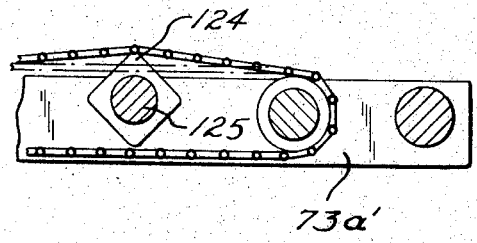

FIG. 14 is an enlarged view of the cylinder of rods seen near the bottom of FIG. 13 with a part thereof shown in central section;

FIG. 15 is an end view of FIG. 14;

FIG. 16 is a top plan view, enlarged, taken along the line 16–16 of FIG. 2;

FIG. 17 is a sectional view taken along the line 17–17 of FIG. 16;

FIG. 18 shows the lower left-hand portion of FIG. 16, enlarged;

FIG. 19 is a sectional view taken along the line 19–19 of FIG. 18;

FIG. 20 is an end elevational view taken along the line 20–20 of FIG. 2, enlarged;

FIG. 21 is a sectional view taken along the line 21–21 of FIG. 20;

FIGS. 22 and 23 are sectional view taken along similarly numbered lines of FIG. 21;

FIGS. 24 and 25 are side elevation and top plan views respectively of a modification to replace the components shown in FIGS. 16 and 17; and FIGS. 26 and 27 are sectional views, enlarged, taken along similarly numbered lines of FIG. 25.

Figure 1:
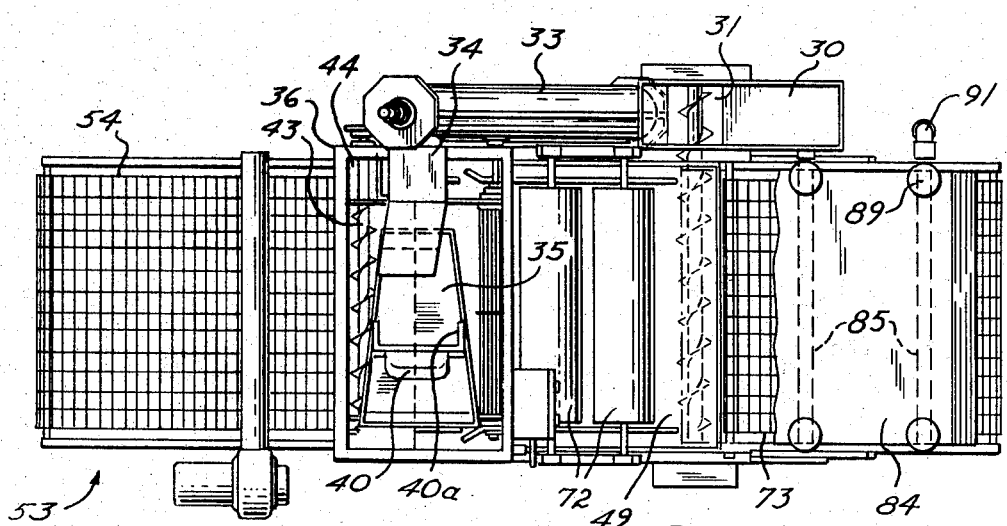
FIG. 1 is a top plan view of the breading machine of this invention.

For a general understanding of the machine, reference may be had to FIGS. 1, 2 and 3 showing a hopper 30 into which breading material may be deposited and which then passes downwardly through a vertical chute 31 to the intake end of an inclined screw conveyor 32 which carries the breading material upwardly in a generally cylindrical tube 33 for discharge at the upper end through a chute 34 to fall upon a vibrating screen 35 which is supported from the upper portions of a hopper 36 by S-clips 37 at the inlet end and by helical spring 38 at the discharge end. Particles which do not pass through the screen 35 fall into a receiving trough 39 supported on the hopper. A vibrator 40 of known construction is rigidly secured at 40a to the sides of the screen. The material which falls through the screen 35 drops into the hopper 36 with an inverted V-shape bottom 41.

The breading material to form the layer on the conveyor belt beneath the food product moves by gravity down the left-hand side of the V-shape bottom 41 as viewed in FIG. 3 to a generally rectangular discharge opening 42 beneath which is a screw conveyor 43 which is rotated in a direction to move the breading material to a discharge end of the screw flight and into a guide box 44, both seen in FIG. 12, horizontally in line with the screw conveyor and extending beyond the discharge end of its screw flight and communicating without obstruction with the discharge end of the conveyor through an opening in a generally vertical baffle 45 substantially coplanar with the side wall 36a of the hopper 36 and approximately in vertical alignment with the terminal end of the conveyor screw flight 43. The breading material then falls vertically downwardly through a downspout 46 which is constructed to prevent bridging over of finely divided material, such as flour, by having two parallel sidewalls 46a joined by one vertical sidewall 46b, opposite which is a side wall 46c which, as clearly seen in FIG. 12, has a lower portion approximately parallel to the wall 46b up to a break point 46d where it is inclined upwardly and away from the wall 46b up to the guide box 44. A kicker paddle 47 rotatable with the shaft 43a of conveyor 43 prevents bridging over of the finely divided material at that point.

At the lower end of downspout 46, the breading material is fed to a generally horizontal screw conveyor 48 which spreads the breading material across the upper run of an imperforate conveyor belt 49 as shown in FIGS. 3 and 12. The spreader screw 48 is of uniform diameter and has its axis parallel with the upper run of belt 49 with the lowest zone of the screw being spaced above this belt a predetermined short distance. As best seen in FIGS. 3, 6 and 7, a housing 50 substantially completely surrounds the screw conveyor 48 save for an upper opening communicating with the downspout 46 and a lower opening just above the belt 49.

To prevent excessive spreading laterally of the layer of breading material on the belt 49, two short generally horizontal plates 51, best seen in FIGS. 4, 7 and 12, are provided, one at each end of and below the screw conveyor 48 and forming part of the bottom for the housing 50. Each of these plates extends upstream of the belt 49 beneath the associated end of the screw conveyor 48 and the plates taper outwardly away from each other in the direction of belt travel as shown at 51a. Without these control plates 51, the breading material tends to creep outwardly at the edges of the belt 49.

A leveling plate resiliently mounted is shown at 52 for controlling the level of the breading layer deposited on conveyor belt 49. This will be described in more detail later.

The food product to be coated is first given a coating of batter material in a is machine indicated generally at 53 at the left-hand end of the machine as shown in FIGS. 1 and 2. This is a known type of machine and further description is believed to be unnecessary here. The batter-coated product is delivered on a wire mesh conveyor 54 over an idler roller 55 seen in FIG. 3 for deposit upon the upper run of the belt 49 already described.

Means is provided for feeding breading material in a smooth and controlled manner from the hopper 36 to deposit on top of the food product carried by conveyor belt 49. Referring to FIGS. 3, 9, 10, 14 and 15, the breading material flows by gravity down the right-hand side of the inverted V-shape bottom 41 of storage hopper 36 to a feeding device 56 which is located in a generally rectangular discharge opening at the bottom of that side of the storage hopper. The device 56 comprises a generally cylindrical assembly of parallel rods 57 mounted in plastic end plates 58 secured, as by pin 59, to shaft 60 by means of which the feeding device 56 is rotated. Radially inside of the rods 57 is a generally cylindrical space most of which is filled by a cylinder 61 fixed to shaft 60 so that breading material cannot pass diametrically across the device 56 but must be carried or pushed around by the individual rods 57. By controlling the speed of rotation of the feeding device 56, increments of breading material are fed on top of the food product as it passes along belt 49 in predetermined amounts because the rods 57 positively move increments of breading material out of the storage hopper if it tended not to flow fast enough, and the rods 57 actually prevent the material moving out of the hopper too fast if such might be the case. The rate of flow through the feeding device 56 is further controlled by an arcuate control valve 62, the control of which is most readily understood from FIGS. 10 and 11. The arcuate control plate 62 is mounted on a horizontal pivot 63 supported in the frame of the machine. At one end, a crank arm 64 is rigidly fastened to the end of shaft 63 and having an opening at its outer end through which enters a pin 65 which is carried at the end of a threaded member 66 which is threaded into an axially extending recess 67 in the hub 68a of a control knob 68. This knob is rotatably mounted in a bracket 69 which in turn is supported on the frame of the machine at 70. A helical spring 71 captured between bracket 69 and knob 68 takes up slack in this control member. Adjustment of knob 68 controls the opening between lips 62a where breading material discharges from the feeding device 56 onto the top of the food product moving along conveyor belt 49.

Downstream from the top breading operation and above the conveyor belt 49 two pressure rolls 72 are rotatably mounted in the frame of the machine and resiliently pressed toward conveyor belt 49 so as to press the breading material into the food product as it passes beneath these rolls.

As clearly seen in FIG. 3, beyond the pressure rolls 72 the food product is transferred from belt 49 to the upper run of an open mesh wire belt conveyor 73 driven in the direction of the arrow there shown by a plurality of drive sprockets 74 mounted on a drive shaft 75 journaled in the frame of the machine and extending across the entire width of the conveyor belt as clearly seen in FIGS. 16, 17 and 18. The general character of the wire mesh belt is shown in FIG. 18 and the drive sprockets engage the laterally extending straight wire portions 73a clearly designated in FIG. 18. Idler collars 76 are provided on cross shaft 77 at the discharge end of conveyor belt 73 as clearly shown in FIGS. 16 and 17.

Means is provided for vibrating the conveyor belt 43 so as to shake off excess breading material. The means shown in FIGS. 16, 17, 18 and 19 comprise a plurality of inverted V-shape members 78 firmly held by crossbars 79 fixed in the frame of the machine so that the tips of members 78 engage the straight wire belt portions 73a during travel of the conveyor belt thus causing it to vibrate. It will be noted in FIGS. 16 and 17 that there are two of the bars 79 supporting the V-shape projections 78 spaced longitudinally of the conveyor 73 and tied together by a plurality of tie rods 80 which are fixed to one of the bars 79 and looped over the other bar. The breading material shaken off belt 73 falls onto a horizontal plate 81 supported on the frame of the machine beneath the lower run of belt 73 in position for the belt to keep the plate 81 clear of breading material as the lower run of the belt passes toward the left in FIGS. 3 and 17 carrying the loose breading material into a recess 82 extending crosswise of the machine and provided with a screw conveyor 83 as shown in FIGS. 3 and 13 which is driven in a direction to carry the breading material crosswise to the downwardly extending chute 31 beneath the hopper 30 previously described. The material shaken from belt 73 is thus carried back to the screw 32 to be returned to the top of the machine.

As shown in FIGS. 1, 2 and 20, a portion of conveyor 73 has the space above it enclosed in a hood 84 which is open only at the opposite ends over the conveyor belt sufficiently to permit the passage of product into and out of the hood. Suspended from the roof of the hood are two air pipes 85 extending above and crosswise of the belt and perforated on their lower sides so as to blow a blast of air upon the breaded food product traveling along belt 73 to dislodge loose breading material. Means is provided near each side of the belt with respect to each of the pipes 85 to adjust the height thereof above the belt. This is clearly seen in FIGS. 20, 21 and 22 where each pipe is mounted in a sleeve 86 rigid with an L-shape bracket 87 which is adjustable vertically by means of a threaded rod 88 which has a threaded connection with the bracket 87 and is manipulatable by a knob 89 available above the roof of the hood. Slotted openings 90 in the vertical wall of the hood permit this adjustment. Each pipe 85 is connected outside of the hood by means of an elbow 91 with a flexible hose 92 which extends beneath the frame of the machine and is supplied with air under pressure from a compressor 93 driven by a motor 94 mounted in a bracket 95 which is connected with the frame of the machine. At the right-hand side of FIG. 20, the hood 84 is connected by bracket 96 to one or more hinge pin connections 97 so that the hood may be swung from the full line position of FIG. 20 to the dot-dash position shown there while the machine is in operation. The flexible hose connections 92 permit this movement of the hood and pipes 85. The hood may be braced in its raised position by a brace 98 shown in dot-dash lines in the bracing position and shown in broken lines stored inside the hood when not in use.

If necessary or desirable, means can be provided for holding each of the pipes 85 in adjusted position so that the air openings 85a are directed as desired by the operator. This shows a set screw 99 in the sleeve 86 which will hold each pipe 85 oriented about its own axis in the position desired.

Referring back to the breading leveler plate 52, the details of this construction are clearly shown in FIGS. 7 and 8. The plate 52 is rigidly attached, as by welding, to a shaft 100 which is rotatably mounted in opposite sides of the housing 50. A plastic disc 101 is pivotally mounted on an extension of shaft 100 and carries a stop pin 102. A control knob 103 is mounted on the extension 100a of the shaft 100 and connected therewith by a helical spring 104 which has its outer end as seen in FIG. 8 connected at 104a with a slot in the shaft extension 100a. At its inner end, the spring 104 is connected to pin 105 carried by the disc 101. A stop projection 106 on the control knob 103 limits the movement of the plate 52 toward the belt 49 when stop 106 engages stop pin 102. The position of disc 101 is fixed, as shown in FIG. 5, by a clamp 107 which is secured in position on housing 50 by a wing nut 108. In operation, disc 101 is turned to place stop pin 102 where desired and then the clamp 107 presses against disc 101 to hold it in position when wing nut 108 is tightened. If desired, an adjustable extension of plate 52 is provided as shown in FIGS. 7 and 8 comprising an auxiliary plate 52a having pin and slot connections as at 109 with the plate 52 with any desired adjustment being held in position by a bolt and nut arrangement 110.

The housing 50 is open at 111 to permit the breading material to flow onto the belt 49. A clean-out opening 112 is provided at the rear of the housing 50 and this is normally closed by a plate 113. A strip of plastic material such as Delrin is shown at 114 in FIG. 7 and this is preferably supplied between the plates 51 and the belt 49 to protect the belt and to prevent leakage there. Referring to FIG. 5, means may be provided to lift shaft 100 and leveling plate 52 out of the machine by providing an elongated opening 115 in the end wall of housing 50 so that when plate 52 is turned with its dimension longitudinally of the opening 115, then shaft 100 may be moved upwardly and toward the left as viewed in FIG. 5 and shaft 100 and plate 52 may be moved out through the opening 115.

As illustrated in FIG. 2, conveyor 73 may be swung upwardly in the direction of the arrow about shaft 75 which carries the drive sprocket 74 to assume the dot-dash position of that FIG. Means is provided, if desired, to pin the conveyor 73 in the dot-dash position for purposes of working on the machine.

In some cases it is desirable to flip the food product over after it has been coated with breading material to dislodge excess breading material which may have packed into a hollow portion of the food product such as the breast of a chicken. A modification for this purpose is shown in FIGS. 24 through 27. Here the open wire mesh conveyor belt 73' is like that previously described except that the belt 73' is longer than sufficient to stretch with upper and lower straight runs between the drive sprockets 74 and the idler collars 76. A support bar 116 is supported by a pair of arms 117 at opposite sides of the conveyor which are pivoted on shaft 75 which carries the drive sprockets 74. Each of the arms 117 has a prop member 118 adapted to be fixed to its associated arm 117 in various adjusted positions by bolt means 119. This permits different heights of the support bar 116 held by the props 118 which engage against the side rails of the conveyor 73a'. The excess material of the conveyor belt extends as a bight between the support bar 116 and Nylon tightening members 120 which are mounted on bar 121 extending crosswise of the conveyor and adjustable by means of a bolt and slot connection 122 in the side rails of the conveyor to press the Nylon members 120 against the slack material of conveyor belt 73' to hold it taut. With this arrangement, the height of the support bar may be varied without changing the length of the belt because the excess of slack material of the belt is always taken up by the Nylon members 120. By this means, food products 123 are raised to the height of the support bar and then flip over as they drop down to the upper run of the conveyor belt at 73" so as to knock off excess breading material.

The belt 73" may be vibrated near the discharge end thereof to dislodge any breading material lying on the wire mesh conveyor belt. To this end, mechanically driven belt vibrator blocks 124 are shown fixed to a cross shaft 125 which is rotatably mounted in the side bars 73a' of the conveyor and rotated by a drive pulley 126 so as to cause the corners of the blocks 124 to alternately lift and drop the upper run of the conveyor belt as illustrated in FIG. 27. The blocks 124 are shown generally square but they could by other polygonal form. Preferably, the blocks 124 engage the conveyor belt at portions thereof indicated at 124a in FIG. 25 where short lengths of wire run continuously along the length of the conveyor belt.

Suitable means is provided for driving all of the components hereinabove described in the directions necessary to carry out their functions. It is thought that the details of these drives form no part of the present invention and would only be confusing. Referring to FIG. 2, a motor M is shown mounted in the lower portion of the frame of the machine and through suitable belts, chains and pulleys, together with belt tighteners and idlers, drive the screw conveyors 43 and 48, the drive pulley 49a for conveyor belt 49, the feeding device 56, the screw conveyor 83, the drive shaft 75 for conveyor 73 and 73', and a drive sprocket 127 acting through gear box 128 to drive the inclined screw conveyor 32 in the tubular housing 33.

The machine thus described will efficiently coat food products with finely divided breading material smoothly and continuously and in a controlled manner.

I claim:

1. In a machine for coating a food product with breading material, an imperforate conveyor belt of fixed width having driving means for carrying said food product in one direction, said belt having an upper run moving in said direction, means for feeding a layer of breading material to said upper run, a leveling plate downstream from and adjacent said feeding means, said plate extending at right angles to the direction of belt travel, means fixed relative to said feeding means and pivoting said plate for oscillation about its upper edge, said plate inclined downwardly from said pivoting means and in the direction of belt travel, resilient means urging the lower edge of said plate toward said belt, and adjustable stop means limiting downward travel of the lower edge of said plate, whereby said plate levels said breading material across said belt and oscillates upwardly from said belt if excess breading material causes pressure back of said plate.

2. A machine as defined in claim 1, wherein said pivoting means comprises a shaft parallel to said plate and fixed to its upper edge, a knob rotatably mounted on said machine and axially aligned with said shaft, a helical spring axially aligned between said shaft and knob, said spring having its opposite ends connected respectively to said shaft and knob, means for retaining said knob in various angular positions about its axis, whereby to control the movement of said plate relative to said belt.

3. A machine as defined in claim 2, including a housing surrounding said plate and shaft and knob, and there being an opening in said housing adjacent said knob permitting removal of said plate and shaft and knob as a unit for cleaning after oscillation of said plate to an inoperative position.

4. In a machine for coating a food product with breading material, an imperforate conveyor belt of fixed width having driving means for carrying said food product in one direction, means for feeding a layer of breading material to the upper surface of said belt including an elongated spreader screw above and crosswise of said belt, said screw of uniform diameter and having an axis parallel with said run of said belt, the lowest zone of said screw being spaced above said belt a predetermined distance, means for rotating said screw about its axis, a supply of breading material communicating with said screw from above, a housing surrounding and closely embracing said screw save for an upper opening communicating with said supply of breading material and a lower opening just above said belt, and said housing including two short generally horizontal plates one at each end of and below said screw and forming part of a bottom for said housing, each of said plates extending upstream of said belt beneath the associated end of said screw and said plates tapering outwardly away from each other in the direction of belt travel, whereby to avoid leakage of breading material laterally outwardly at the ends of said screw.